United States Patent Office 3,322,705
Patented May 30, 1967

3,322,705
POLYOLEFINS STABILIZED WITH MIXTURES COMPRISING A 2-HYDROXY, 4-BENZYLOXY BENZOPHENONE, THIODIPROPIONATE AND METAL SALT OF A MONOCARBOXYLIC ACID
Otto S. Kauder, Jamaica, N.Y., and Aaron Rosenbaum, Orange, N.J., assignors to Argus Chemical Corporation, a corporation of Delaware
No Drawing. Filed Feb. 15, 1966, Ser. No. 527,524
20 Claims. (Cl. 260—23)

This is a continuation-in-part of application Ser. No. 142,788, filed Oct. 4, 1961, now abandoned.

This invention relates to the stabilization of polyolefin compositions, and more particularly, to the stabilization of polyolefin compositions against deterioration in physical properties resulting from exposure to sunlight or ultraviolet light. This invention further relates to new organic compounds, polyolefin stabilizer compositions containing these compounds, and polyolefin compositions stabilized thereby.

Thermoplastic compositions such as polypropylene have found wide acceptance as useful materials for making foils, films, fibers and molded articles. These articles are inherently strong, can be made dimensionally stable or sufficiently flexible to suit the requirements of their intended use, and are relatively inert to common household cleansing agents and solvents. They are easily and variously colored to give them an attractive appearance. However, such articles are unfortunately subject to rapid and severe degradation and deterioration, as evidenced by changes in the physical properties of the polyolefin, due to the effects of light, and particularly ultraviolet light. Such photodegradation is particularly evidenced by surface cracking, increased brittleness, lost of dielectric properties, and discoloration of the polymer.

To overcome this deterioration a number of so-called ultraviolet light inhibitors or light stabilizers have been used by incorporating them with the polymer in order to stabilize it against the deleterious effects of light. However, some of the known light stabilizers for such thermoplastic materials as cellulose acetate, polystyrene, polyvinyl chloride, and the like are not sufficiently compatible with polyolefins, and exude from the polyolefin composition after incorporation therein. Other known stabilizers are too highly volatile and will volatilize out of the plastic composition during processing and thereafter, thus leaving the composition sooner or later unprotected against the deleterious effects of light. Other known stabilizers have an objectionable odor which is imparted to the polymer when they are incorporated therein to protect the polymer against the deteriorative effects of light. Some known light stabilizers are themselves colored so that they impart an objectionable initial color to the polymer, precluding the preparation of clear or white articles therefrom. Furthermore, when polyolefin compositions stabilized with some of the previously known light stabilizers are exposed to sunlight for a period of time, the polyolefin composition loses its resistance to photodegradation.

Since light stabilizers vary in their ability to absorb ultraviolet light, in resistance to removal by extraction or volatilization, and in stability against the effects of light, oxygen, and water, it has been impossible to predict the effectiveness of any particular compound incorporated in any particular polymer with any degree of certainty.

In view of the above problems it would be desirable, and it is the principal object of this invention, to provide a new group of organic compounds useful for increasing the resistance of polyolefin compositions to degradative deterioration due to exposure to light.

It is a further object to provide an improved polyolefin composition of increased resistance to the degradative effects of light.

It is a further object of this invention to provide improved stabilizer compositions incorporating the new organic compounds of this invention which are effective in increasing resistance to deterioration of polyolefin compositions incorporating such stabilizing compositions to both heat and light.

It is an object of this invention to provide a group of organic compounds useful for increasing the resistance of polyolefin compositions to photodegradation, which may be used in conjunction with other polyolefin stabilizers, without disadvantageous effects upon the stabilizing action of the others, and which are compatible with polyolefins and other polyolefin additives, and which retain their stabilizing action for an essentially unlimited time.

It is a particular object of this invention to provide such stabilizer compositions and polyolefin compositions containing the same based on hydroxy benzyloxybenzophenones and their derivatives.

It is a still further object to provide a group of such compositions which have little or no color and have a low odor level.

Another object of the invention is to provide a group of such compositions which have low volatility and which are sufficiently compatible with or freely miscible with polyolefins to impart effective stabilization. Compatibility is especially important, since an incompletely dispersed product would give poor stabilizing protection.

The above and related objects are achieved by means of a compound having a 2-hydroxy-4-benzyloxybenzophenone nucleus, i.e., a nucleus of the structural formula:

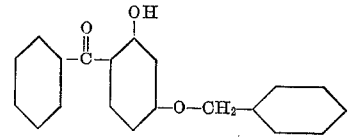

This nucleus is inclusive of the compound 2-hydroxy-4-monobenzyloxy-benzophenone and derivatives thereof bearing groups attached to any of the ring carbon atoms of the above nucleus. Such substituent groups modify the compatibility of the stabilizing composition with polyolefins as well as the compatibility of the compound with other polyolefin additives and stabilizers, and are nonreactive with polyolefins and other constituents thereof.

4-monobenzyl ethers of 2-hydroxybenzophenone have been found to be remarkably useful and surprisingly effective in improving the resistance of polyolefins to degradative deterioration due to the effects of light.

Although the light absorptive qualities of benzophenones have been known, and although some alkyl ethers thereof have been used to stabilize certain polymers, it was surprising to find that the 4-monobenzyl ethers of 2-hydroxybenzophenone increased the resistance of polyolefins to photodegradation, and that, at the same time, the compounds of this invention had the other required chemical and physical properties necessary for use in polyolefins. The desirability that the added stabilizing composition should not itself discolor the polymer or impart an undesirable odor to it has already been discussed. It is necessary that the stabilizer be compatible with the polyolefin. However, those skilled in the art have been unable to predict the compatibility of any one stabilizer with any particular polymer because compatibility is known to vary widely not only between different compounds, but even for related or the same compounds in different polymers. Heretofore it has been found that compatibility in polyolefins is increased by having the character of the stabilizer molecule approximate that of long-chain aliphatic hydrocarbons. It was therefore unexpected to find that the benzyl ethers of 2,4-di-hydroxy benzophenone were sufficiently compatible with polyolefins. Since the light absorptive qualities of known light absorbers may vary widely in different polymers, and since, moreover, additional stabilizers or other additives in the polymer may alter the light absorbing qualities of the light stabilizer, it was unexpected to find these various and unpredictable variables operating favorably in the case of the 4-monobenzyl ethers of 2-hydroxy benzophenone when used in the light stabilization of polyolefins. It was also surprising to discover that some asymmetrical benzophenones had advantages over symmetrical benzophenones, and particularly that those with only one hydroxy group, in the same ring in the benzophenone to which the benzyl ether was attached, were preferable to those having hydroxy groups substituted on both benzene rings in the benzophenone.

The organic stabilizer compounds of this invention, containing a nucleus of the above structural formula, have the following general formula:

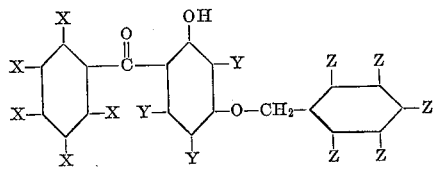

wherein the X-radicals are selected from the group consisting of hydrogen, halogen, (such as fluorine, chlorine, bromine and iodine, and preferably chlorine or bromine), nitro and R-radicals of from one to about thirty carbon atoms; wherein the Y-radicals are selected from the group consisting of hydrogen, halogen (such as fluorine, chlorine, bromine and iodine, and preferably chlorine or bromine), and R-radicals of from one to about thirty carbon atoms; and wherein the Z-radicals are selected from the group consisting of hydrogen, halogen (such as fluorine, chlorine, bromine and iodine, and preferably chlorine and bromine), and R-radicals of from one to about thirty carbon atoms.

Within the above limitations, the X, Y, and Z-radicals substituted on any ring or on different rings can be the same or different. That is, for instance, the para Z-radical can be an R-radical; while one ortho Z-radical can be the same or a different R-radical and the other ortho Z-radical can be a halogen; and the two meta Z-radicals can be hydrogen. The X and Y-radicals on the other rings can be an R-radical, or a different radical; and if an R-radical they can be the same, or different, from any Z-radicals which are R-radicals. Other combinations will be apparent to those skilled in the art.

The R-radical is an organic radical and can be selected from the group consisting of saturated aliphatic, alicyclic, and heterocyclic groups of from one to thirty carbon atoms.

There is no upper limit, other than impracticability, on the number of alkyl carbon atoms. Typical R-radicals are alkyl, cycloalkyl, acyl, alkoxy, oxyalkylene, and hydroxyalkylene radicals, and esters thereof with organic carboxylic acids. These R-radicals may, if desired, contain inert, nonreactive substituents such as halogen and other carbocyclic and heterocyclic ring structures.

Typical R-radicals are, for example, methyl, ethyl, propyl, isopropyl, butyl, isobutyl, t-butyl, amyl, isoamyl, n-octyl, isooctyl, 2-ethylhexyl, t-octyl, decyl, ethylnonyl, ethylmethyloctyl, diethylheptyl, undecyl, dodecyl, pentadecyl, octodecyl, tricosyl, and nonacosyl; monochloroethyl, polychloroethyl, monobromopropyl, polybromopropyl, fluoroheptyl, chlorododecyl, chlorotricosyl; hydroxychlorononyl, hydroxybromodecyl, hydroxybromotricosyl; hydroxyethyl, hydroxypropyl, monohydroxyundecyl, dihydroxyundecyl, hydroxyundecenyl, hydroxydodecyl, glyceryl, sorbityl, pentaerythrityl, and polyoxyalkylene radicals such as those derived from diethylene glycol, triethylene glycol, polyoxyethylene glycol, polyoxypropylene glycol, and polyoxypropyleneoxyethylene glycol, and esters thereof with any of the organic aliphatic, alicyclic, or oxygen-containing heterocyclic acids. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, and other carbocyclic ring structures condensed therewith. Exemplary of such acids are, acetic, propionic, butyric, valeric, hexanoic, ethylheptanoic, n-octanoic, isooctanoic, capric, undecanoic, lauric, myristic, palmitic, stearic, chlorocaproic, and hydroxycapric and behenic acids.

As typical examples of compounds that are intended to be included within the scope of this invention may be mentioned the following:

2-hydroxy-4-parachlorobenzyloxy-benzophenone;

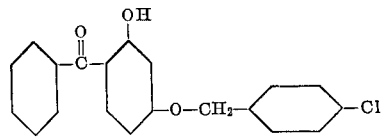

2-hydroxy-4-parabromobenzyloxy-benzophenone;

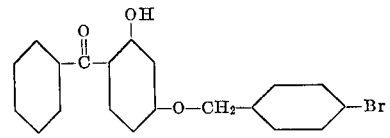

2-hydroxy-4-parafluorobenzyloxy-benzophenone;

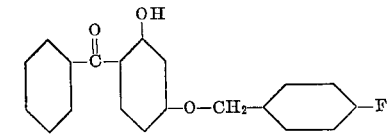

2-hydroxy-4-paraiodobenzyloxy-benzophenone;

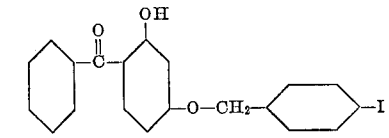

2-hydroxy-4-(3,4-dichlorobenzyloxy)-benzophenone;

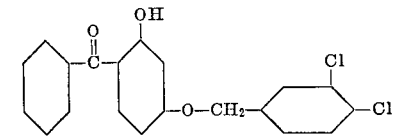

2-hydroxy-4-(pentachlorobenzyloxy)-benzophenone;

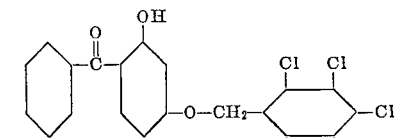

2-hydroxy-4-benzyloxy-benzophenone;

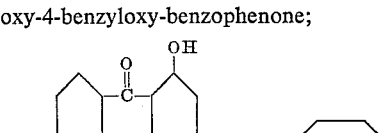

2-hydroxy-4-(pentachlorobenzyloxy)-5-methyl-benzophenone;

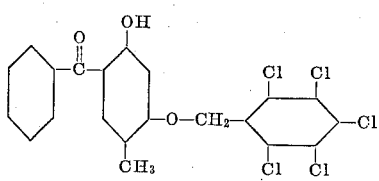

2-hydroxy-4-benzyloxy-5-chlorobenzophenone;

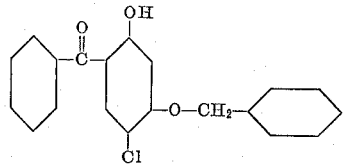

2-hydroxy-4-benzyloxy-5-hexyl-2',4'-dimethyl-benzophenone;

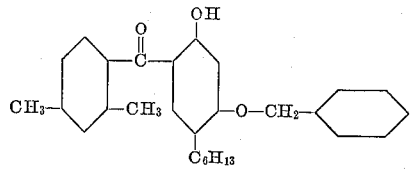

2-hydroxy-4-(3,4-dichlorobenzyloxy)-4'-t-butylbenzophenone;

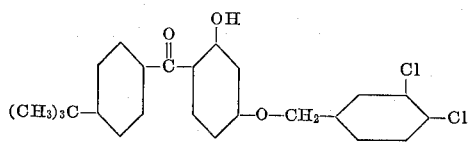

2-hydroxy-3-methyl-4-(2,4-dimethylbenzyloxy)-4'-nitrobenzophenone;

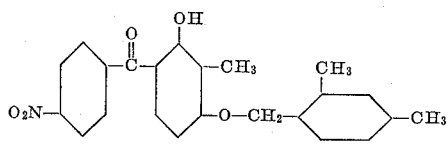

2-hydroxy-4-(4-hexylbenzyloxy)-benzophenone;

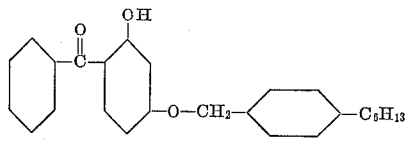

2-hydroxy-4-benzyloxy-2',4',5'-trichlorobenzophenone;

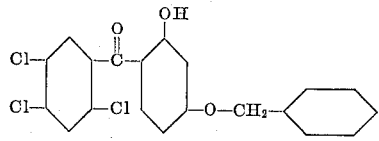

2-hydroxy-4-(4-ethylbenzyloxy)-3'-chloro-benzophenone;

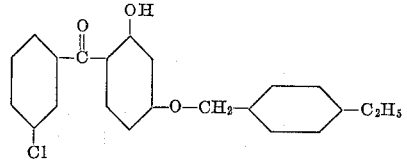

2-hydroxy-4-(3-bromo-4-isobutoxy-5-stearyl-benzyloxy)-6-ethyl-4'-chloro-benzophenone;

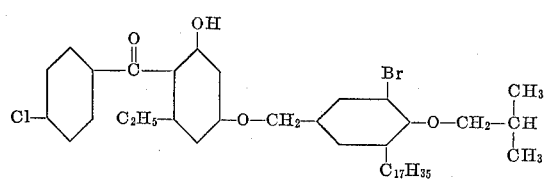

2-hydroxy-4-(5-cyclohexylbenzyloxy)-5-furfuryl-3'-furfuryl-benzophenone;

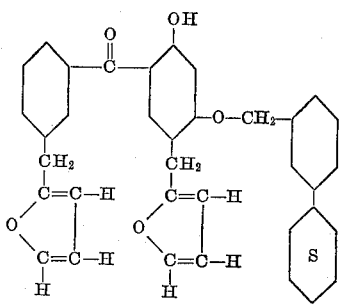

2-hydroxy-4-(5-furfurylbenzyloxy)-5-cyclohexyl-3'-cyclohexyl-benzophenone;

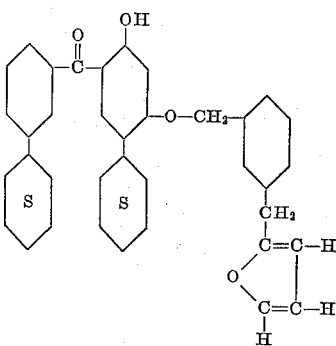

Several methods are known for the synthesis of compounds such as those of this invention. One is the Friedel-Crafts ketone synthesis in the presence of known catalysts such as aluminum chloride, stannic chloride, toluenesulfonic acid, boron fluoride, or fused zinc chloride. Starting products, in the preparation of the compositions of this invention by the Friedel-Crafts reaction, are benzoic acid or its acid chloride, which can have R, $NO_2$, or halogen substituents, and benzyl ethers of resorcinol, which can have R or halogen substituents in the resorcinol group, the benzyl group, or both.

An alternative and very flexible method is based on the selective reactivity of the para hydroxyl group in polyhydroxy benzophenones. As starting material 2,4-dihydroxybenzophenone is used and the para hydroxy is selectively etherified with benzyl chloride, which may or may not itself have substituent R or halogen groups on its ring.

Other methods of synthesis will be apparent to those skilled in the art.

The stabilizers of this invention may be used in conjunction with other polyolefin stabilizers, without disadvantageous effect upon the stabilizing action of the other stabilizers or the stabilizers of this invention.

In many cases an enhanced, or synergistic, activity is observed in such combinations. Such additional stabilizers include, for instance, phenols, organic phosphites, thiodipropionic acid esters, polyvalent metal salts of organic acids, organic mercaptans, organic polysulfides, as well as other light stabilizers.

Most polymeric compositions comprise many ingredients such as plasticizers, fillers, pigments, as well as other stabilizers. The compositions of this invention may be employed in polyolefins in conjunction with such additives without adverse effects.

When the stabilizers of this invention are used in conjunction with a phenol the phenol contains one or more phenolic hydroxyl groups, and may contain one or more phenolic nuclei. In addition, the phenolic nucleus may contain an oxy or thio ether group.

The alkyl-substituted phenols and polynuclear phenols because of their molecular weight have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in any alkyl, alicyclidene and alkylene groups, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one, or in the same or different rings, if there are more than one. In the case of bicyclic phenols, the rings can be linked by thio or oxyether groups, or by alkylene, alicyclidene or arylidene groups.

The monocyclic phenols which can be employed have the structure:

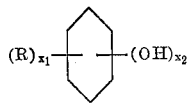

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

Polycyclic phenols include aromatic nuclei which are linked by a bivalent linking radical, and are defined by the formula:

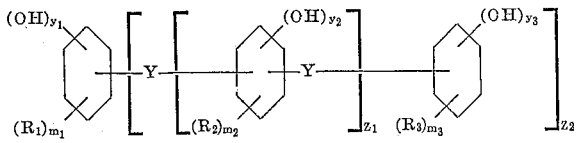

wherein $R_1$, $R_2$ and $R_3$ are inert substituent groups of the type of R above, Y is a bivalent linking radical; $m_1$ is an integer from zero to a maximum of $5-(z_2+y_1)$, $m_2$ can be an integer from zero to three and $m_3$ an integer from zero to four, $z_1$ can be an integer from zero to about six and $z_2$ an integer from zero to five, preferably zero or one. Preferably, the hydroxyl groups in polycyclic phenols are located ortho and/or para to Y. There can be one or more hydroxyl groups per phenyl nucleus, $y_1$, $y_2$ and $y_3$ representing the number thereof. Preferably, there will be only one hydroxyl group per phenyl nucleus. The phenolic hydroxyl may be either hindered, i.e., substituted in both positions ortho to the hydroxyl group, or partially hindered or unhindered, i.e., substituted in one or neither position.

Y can be a single bond, as in diphenyl, or a bivalent group, such as:

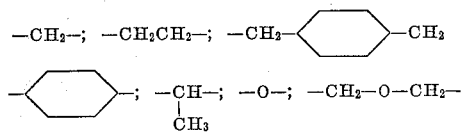

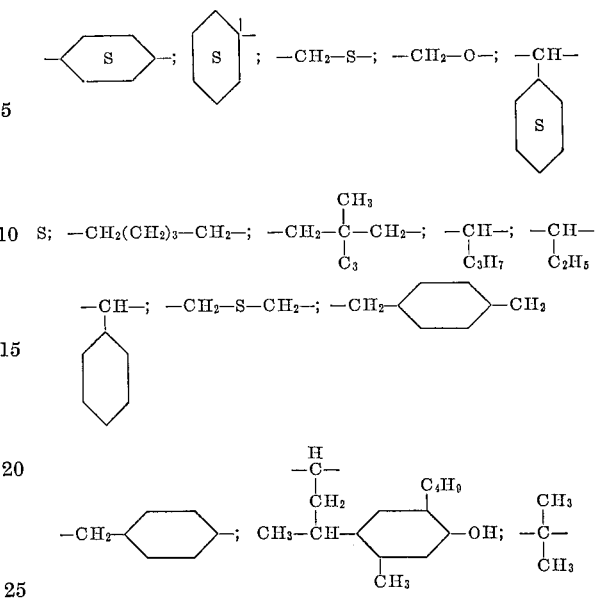

The various Y and R groups are exemplified in the following compounds.

Exemplary of satisfactory monohydric phenols are 2,6-di-tertiary-butyl-4-methyl phenol, 2-tertiary-butyl-4-methoxy phenol, nonyl phenol, dodecyl phenol, dinonyl phenol, phenyl phenol, tetradecyl phenol, and tetrahydro-α-naphthol.

Exemplary polyhydric phenols are orcinol, propyl gallate, catechol, resorcinol, p-octyl resorcinol, p-dodecyl resorcinol, p-octadecyl catechol, p-isooctyl-phloroglucinol, pyrogallol, hexahydroxy benzene, p-isohexyl-catechol, 2,6-ditertiary butyl resorcinol, 2,6-diisopropyl phloroglucinol, methylenebis(2,6-ditertiary butyl-m-cresol), methylenebis(2,6-ditertiary butyl phenol), 2,2-bis(4-hydroxy phenyl propane, methylenebis(p-cresol), 4,4'-thio-bis-phenol, 4,4'-oxobis(3-methyl-6-isopropyl phenol), 4,4'-thiosbis(3-methyl-6-tertiary butyl phenol), 2,2'-oxobis(4-dodecyl phenol), 2,2'-thiobis(4-methyl-6-tertiary butyl phenol), 2,6-diisooctyl resorcinol, 4,4-n-butylidenebis(2-tertiary-butyl-5-methyl-phenol), 4,4-benzylidenebis(2-tertiary-butyl-5-methyl-phenol), 2,2'-methylenebis(4-methyl-6-(1'-methylcyclohexyl)-phenol), 4,4'-cyclohexylidenebis(2-tertiary butylphenol), 2,6-bis(2'-hydroxy-3'-tertiary-butyl-5'-methylbenzyl-4-methylphenol), 4-octyl pyrogallol, and 3,5-ditertiary butyl catechol.

When the benzophenone stabilizer is used in conjunction with an organic triphosphite the organic phosphite contains from one to three groups selected from aryl, alkyl, aryl alkyl, alkaryl, cycloaliphatic, and heterocyclic groups having from one to twenty carbon atoms and from one to three heterocyclic atoms other than nitrogen. These phosphites are neutral, that is, all of the valences of the phosphorus atom are taken up with the said groups, which can be monovalent, bivalent or trivalent as desired. Furthermore, these groups may be present in any combination. When bivalent or trivalent, they form heterocyclic rings of the type

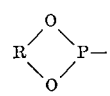

and may also form polymeric phosphites of the type

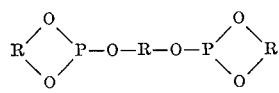

R representing a bivalent group derived from a glycol.
Exemplary are triphenyl phosphite, tricresyl phosphite, tri(dimethylphenyl) phosphite, tri-n-butyl phosphite, triisooctyl-phosphite, tridodecyl phosphite, diisooctyl phenyl phosphite, neopentyl glycol phenyl phosphite, propylene glycol isooctyl phosphite, isooctyl diphenyl phosphite, tri(p-t-octylphenyl) phosphite, tri(p-t-nonylphenyl) phosphite, tri(p-t-nonyl-o-cresyl) phosphite, diethylene glycol bisbutylene glycol bisphosphite, tribenzyl phosphite, isobutyl dicresyl phosphite, isooctyl di(p-t-octylphenyl) phosphite, tri(2-ethylhexyl) phosphite, tri(2-cyclohexylphenyl) phosphite, tri-alpha-naphthyl phosphite, trifuryl phosphite, tritetrahydrofurfuryl phosphite, tricyclohexyl phosphite, and tricyclopentyl phosphite.

When the benzophenone stabilizer is used in conjunction with a thiodipropionic acid ester the thiodipropionic acid ester has the following formula:

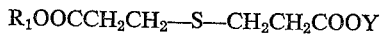

in which $R_1$ is an organic radical selected from the group consisting of hydrocarbon radicals such as alkyl, alkenyl, aryl, cycloalkyl; mixed alkyl aryl, and mixed alkyl cycloalkyl radicals; hydroxyalkyl and hydroxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units:

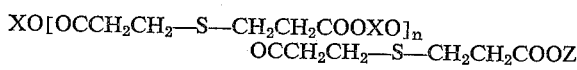

where Z is hydrogen, $R_2$ or M; $n$ is the number of thiodipropionic acid ester units in the chain; and X is a bivalent hydrocarbon group of the type of $R_1$; the value of $n$ can range upwards from 0, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX\text{-}O]_nOCCH_2CH_2\text{-}SCH_2CH_2COOZ$
(d) $R_1OOCCH_2CH_2SCH_2CH_2COOM$ In the above formulae $R_1$ and $R_2$, M, X and Z are the same as before. In the polymer (c), as in the other forms of thiodipropionic acid esters, the total number of carbon atoms per sulfur atom is within the range from about ten to about sixty. The value of $n_1$ can range upwards from 1.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalky groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclo hexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,3-propylene,

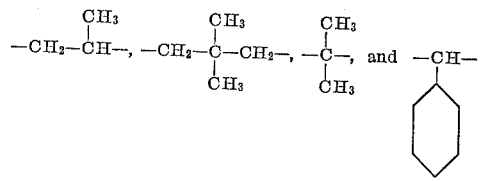

arylene radicals such as phenylene

methylenephenylene

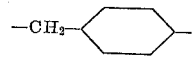

dimethylene phenylene,

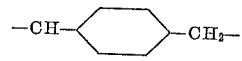

and alicyclylene radicals such as cyclohexylene

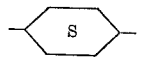

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds but where they are not available, they are readily prepared by esterification of thiodipropionic acid and the corresponding alcohol.

When the benzophenone stabilizer is used in conjunction with a polyvalent metal salt of an organic acid the polyvalent metal salt will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, iso-octoic acid, capric acid, undecylic acid, lauric acid, myristic acid, palmitic acid, margaric acid, stearic acid, oleic acid, ricinoleic acid, behenic acid, chlorocaproic acid, hydroxyl capric acid, benzoic acid, phenylacetic acid, butyl benzoic acid, ethyl benzoic acid, propyl benzoic acid, hexyl benzoic acid, salicyclic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The stabilizers of this invention can be incorporated into polyolefin by conventional methods. The stabilizers may be incorporated into the polymer by dry blending, deposition from a solvent, milling on heated rolls and related methods conventionally employed for blending or incorporating stabilizers into organic plastic materials. Mixing is continued until the mixture is substantially uniform. The resulting composition is then brought to the size and shaped desired for marketing or use.

The stabilized polyolefin may be worked into the desired shape, such as by milling, calendering, extrusion injection molding or fiber forming. In such final form the stabilized polymer will have considerably improved resistance to deterioration due to exposure to light.

The benzophenones of this invention have low vapor pressures at polypropylene working temperatures, i.e., at approximately 350° F., so that they will not be lost from the mix during hot-working. They are also compatible with the polyolefin at all temperatures to which the polymer is to be subjected.

A sufficient amount of the benzophenone of this invention, with or without additional stabilizers, is used to improve the stability of the polyolefin against deterioration in physical properties, including, for example, discoloration, increased brittleness, and surface cracking, under the conditions of exposure to light to which the polyolefin will be subjected. Very small amounts are usually adequate. Amounts within the range of 0.001 to about 5% of stabilizer by weight of polymer impart satisfactory light stabilization. Preferably, from 0.1 to 2.5% of stabilizer is employed for optimum light stabilization for normal exposure to light. If additional stabilizers are employed to reduce degradative deterioration due to other factors, they should be within the range from about 0.004 to about 5%, the total amount of stabilizers being within the range of from 0.005 to about 5%, preferably 0.1 to 2.5%.

Preferably, the stabilizer composition comprises from about 0.001 to about 0.25% of the benzophenone light stabilizer of this invention, from about 0.025 to about 0.5% of a phenol, from about 0.05 to about 1.25% of a phosphite, and from about 0.05 to about 1% of a thiodipropionic acid ester, with from about 0.025 to about 0.75% of a polyvalent metal salt, when present.

If a combination of stabilizers is to be utilized, they may be formulated as a simple mixture for incorporation in the polymer by the polymer manufacturer or by the converter. An inert organic solvent can be used to facilitate handling, if the ingredients do not form a homogeneous mixture or solution.

The stabilizers of this invention effectively increase the resistance to photodegradation of all solid polyolefins, as distinguished from polyolefins in the liquid form or in semi-liquid gel-like forms, such as are used as greases and waxes. Polypropylene solid polymer, for instance, can be defined as having a density of from 0.86 to 0.91, and a melting point of about 300° F. The stabilizers of this invention may be used with the conventional branched (high pressure) polyethylene such as DYNH or Alathon, as well as with linear (low pressure) polyethylene such as Grex, Super-Dylan, or any other commercial grade of polyethylene. The stabilizers of this invention may also be used with poly-n-butylene, poly-4-methyl-pentene, polypentylene, and polyhexylene, as well as the higher polyolefin polymers.

The stabilizers of the invention is applicable to polyolefins prepared by any of the various procedures, for the molecular weight and tacticity are not factors affecting this stabilizer. Isotactic polypropylene, available commercially under the trade names Pro-Fax, Escon and Olefane and having a softening or hot-working temperature of about 350° F., is an example of a sterically regular polypropylene polymer.

Mixtures of polyolefins with other compatible polymers and with copolymers and with copolymerizable monomers not reactive with the benzophenones of this invention also can be stabilized in accordance with this invention. For example, mixtures of polyethylene and polypropylene, polybutylene and polypropylene, and copolymers of propylene and ethylene and propylene and butylene, may be stabilized by the addition of these stabilizers, alone or in combination with other light stabilizers and/or other polyolefin stabilizers used to increase the resistance of the polymer to deterioration in physical characteristics due to aging, heat, or other factors.

The light stabilizing effect of the stabilizers of this invention was evaluated in the working examples which follow by measuring and comparing the extent of photodegeneration occurring in samples of stabilized and unstabilized polyolefins, using an Atlas twin arc weatherometer.

Since purity of polyolefins, extent of degradation, and resistance to embrittlement are physical characteristics capable of evaluation by observation of changes in the melt index of the polymer, additional tests were also conducted comparing the melt index of stabilized and unstabilized polymer before and after exposure in the Atlas twin arc weatherometer. There is a direct correlation between the rate of increase in melt index and the rate of deterioration in the above-mentioned properties due to exposure to light, and particularly ultraviolet light. The stabilizers of this invention significantly reduce the rate of such photodegradation, as can be demonstrated by a comparison of the melt index ratios of stabilized and unstabilized test samples. Such melt index ratios were obtained using a modified ASTM D1238–57T test procedure for determining melt index. The ratio or change in melt index for this period, $$\frac{M\ 350\ hours}{M\ initial}$$

is an accurate measure of the degree of stabilization imparted by the stabilizer added, irrespective of the numerical value of the initial melt indices of the different samples of one particular polymer. The lower the ratio the less the change, and the greater the stabilizing effect.

*Example 1*

(a) The preparation of 2-hydroxy-4-(3,4-dichlorobenzyloxy)-benzophenone is typical.

A mixture of 2,4-dihydroxybenzophenone (18.7 g.), 3,4-dichlorobenzylchloride (18.3 g., which constitutes a 7% excess), and anhydrous potassium carbonate (19.8 g., 220% excess), was heated under reflux for eighteen hours in methyl ethyl ketone (187 cc.); the solution was subsequently filtered while warm. The desired product crystallized from the filtrate as small pale yellow prismatoid crystals, and an additional quantity was recovered by concentrating the mother liquor by evaporation. The total yield obtained was 18.5 g. (62% of theoretical) having a melting range of 158 to 162° C.

(b) Polypropylene stabilizing compositions, or so-called "stabilizer systems," were prepared.

The stabilizers named in Table I were weighed and dispersed in powder form by hand stirring in the proportions indicated.

Two sample stabilizing systems were prepared, one with and the other without a light stabilizer of this invention.

TABLE I

| Sample No. | Parts | |
|---|---|---|
| | A | B |
| 4,4'-butylidene-bis-(3-methyl-6-t-butyl-phenol) | 0.05 | 0.05 |
| Isooctyl diphenyl phosphite | 0.14 | 0.14 |
| Zinc 2-ethylhexoate | 0.06 | 0.06 |
| Dilauryl thiodipropionate | 0.25 | 0.25 |
| 2-hydroxy-4-(3,4-dichlorobenzyloxy)-benzophenone | | 0.25 |

Both samples A and B constituted stabilizing compositions or "stabilizing systems," the latter including one of the light stabilizers of this invention. Stabilizing compositions A and B were slurries at room temperature and clear liquids upon warming. The addition of 2-hydroxy-4-(3,4-dichlorobenzyloxy)-benzophenone, a light stabilizer in accordance with this invention, did not adversely affect the heat stabilizing qualities of the constituents of composition A. The physical characteristics of the stabilizing compositions was found to be favorable for storing and handling, remaining in the form of usable mixtures of uniform composition, and retaining stabilizing characteristics for a substantially unlimited period of time.

(c) Two stabilized polypropylene compositions were prepared, one with and one without a light stabilizer in accordance with this invention. A total of 0.25% light stabilizer was used. The stabilizer systems prepared in Example 1(b), above, were weighed and dispersed by hand stirring in 100 parts of powdered previously unstabilized polypropylene, reduced specific viscosity 3.4, having an initial melt index of 1.0, ASTM D 1238–57T, at 230° C. to yield the proportions indicated in Table II, below. The mixture was placed on a 2-roll mill and fluxed for five minutes at 170±2° C.

TABLE II

| Sample No. | Parts | |
|---|---|---|
| | C | D |
| Polypropylene (Profax 6501) | 100 | 100 |
| 4,4'-butylidene-bis-(3-methyl-6-t-butyl-phenol) | 0.05 | 0.05 |
| Isooctyl diphenyl phosphite | 0.14 | 0.14 |
| Zinc 2-ethylhexoate | 0.06 | 0.06 |
| Dilauryl thiodipropionate | 0.25 | 0.25 |
| 2-hydroxy-4-(3,4-dichlorobenzyloxy)-benzophenone | | 0.25 |

The presence of a light stabilizer of this invention in stabilizing composition B which was incorporated with the polymer to give the stabilized polypropylene sample D did not impart any color or odor to the polymer. Stabilizing composition B, incorporating a light stabilizer of this invention, was compatible with the polypropylene and of sufficently low volatility so that it was not lost from the polymer during processing or subsequent thereto. It was also found that the stabilizer system of this invention did not appear to "bleed out" of the polymer even over an extended period of time.

(d) Polypropylene stabilized with 2-hydroxy-4-(3,4-dichlorobenzyloxy)-benzophenone was compared with polypropylene not containing the light stabilizer of this invention.

As test samples stabilized polypropylene compositions C and D, prepared in part (c) above, were used. As test pieces and controls 6" x 6" x 0.020" molded slabs made from each of the sample compositions were used. One such slab of each sample composition was exposed for 350 hours in the weatherometer at 52° C. Black Panel temperature. Subsequently the color and melt index of the unexposed sample was compared with that of the sample exposed to the degradative effects of light. The melt indices of the samples were determined at 230° C. using a 2160 g. weight load on the plastometer piston.

TABLE III

| Sample No. | Unexposed | | Exposed (350 hours) | |
|---|---|---|---|---|
| | C | D | C | D |
| Melt Index | 1.0 | 1.0 | >120 | 33.0 |
| Color | White | White | White | White |

The date of Table III clearly indicates that the addition of a light stabilizer of this invention as additional stabilizer to a composition of polypropylene stabilized with conventional stabilizers markedly improves the resistance of the polymer to degradation due to exposure to light.

After 350 hours in the weatherometer photo-degradation had caused the melt index of the unstabilized sample to rise to a figure in excess of 120, or too high to be measured, while the melt index of the similarly exposed sample stabilized with the light stabilizer of this invention had risen to only 33.

The addition of the stabilizer of this invention did not impair the initial clear white color of the sample to which it was added, and it assisted in maintaining this good color upon exposure in the weatherometer.

*Example 2*

A mixture of 2,4-dihydroxybenzophenone (18.7 g.), benzylchloride (12.1 g.), and anhydrous potassium carbonate (19 g.), was heated under reflux for eighteen hours in 185 cc. of methyl ethyl ketone. The resulting solution was filtered while warm. The 2-hydroxy-4-benzyloxy-benzophenone crystallized from the filtrate as light tan plateshaped crystals of about one millimeter diameter and an additional quantity was recovered by evaporation of the mother liquor. The 2-hydroxy-4-benzyloxy-benzophenone had a melting range between 119 and 122° C. 65% of theoretical yield was obtained.

*Example 3*

A mixture of 2,4-dihydroxybenzophenone (18.7 g.), 4-bromobenzylchloride (18.5 g.), and anhydrous potassium carbonate (19 g.) was heated under reflux for eighteen hours in methyl ethyl ketone (187 cc.) solvent. The solution was subsequently filtered while still warm. 2-hydroxy-4-parabromobenzyloxy-benzophenone was crystallized from the filtrate and additional crystals were recovered by concentrating the mother liquor by evaporation. The total yield obtained was 31% of theoretical.

*Example 4*

In order to prepare 2-hydroxy-4-(2,3,4,5,6-pentachlorobenzyloxy)-benzophenone a mixture of 2,4-dihydroxybenzophenone (18.7 g.), 2,3,4,5,6-pentachlorobenzyl chloride (32.2 g.), and anhydrous potassium carbonate (19.8 g.), were heated under reflux for eighteen hours in 187 cc. methyl ethyl ketone. The solution was subsequently filtered while still warm. The product crystallized from the filtrate as long white needle shaped crystals, and an additional quantity of crystals was recovered by concentrating the mother liquor by evaporation. The 2-hydroxy-4-(2,3,4,5,6-pentachlorobenzyloxy) - benzophenone had a melting range of from 189 to 191° C. The yield was 84% of that theoretically possible.

*Example 5*

(a) Polypropylene stabilizing compositions, or so called "stabilizer systems," were prepared. The stabilizers named in Table IV below were weighed and mixed in the proportions indicated. Stabilizing systems E, F and G were prepared without the light stabilizer of this invention; stabilizer systems H through P were prepared including a benzophenone light stabilizer of this invention.

Each of the stabilizer systems, compositions E through P, were in the form of physically and chemically stable slurries which could be stored for an indefinite period of time without inhibition of the stabilizing activity of the constituents.

(b) To stabilizing compositions H, L, and P, respectively, xylene was added in a quantity sufficient to dissolve the slurry, thus yielding stabilizer systems in the form of clear solutions which could be stored for an indefinite period of time and uniformly and easily mixed with polypropylene.

TABLE IV

| Sample No. | Parts | | | | | | | | | | | |
|---|---|---|---|---|---|---|---|---|---|---|---|---|
| | E | F | G | H | I | J | K | L | M | N | O | P |
| 4,4'-thiobis(2-tert-butyl-5-methylphenol) | 0.05 | | | 0.05 | | | 0.05 | | | 0.05 | | |
| Isooctyl diphenyl phosphite | 0.14 | 0.14 | 0.14 | 0.14 | 0.14 | 0.14 | 0.14 | 0.14 | 0.14 | 0.14 | 0.14 | 0.14 |
| Zinc 2-ethylhexoate | 0.06 | 0.06 | 0.06 | 0.06 | 0.06 | 0.06 | 0.06 | 0.06 | 0.06 | 0.06 | 0.06 | 0.06 |
| 4,4'-butylidene-bis-(3-methyl-6-t-butyl-phenol) | | 0.05 | 0.05 | | 0.05 | 0.05 | | 0.05 | 0.05 | | 0.05 | 0.05 |
| Dilauryl thiodipropionate | | 0.25 | | | 0.25 | | | 0.25 | | | 0.25 | |
| 2-hydroxy-4-benzyloxybenzophenone | | | | 0.25 | 0.25 | 0.25 | | | | | | |
| 2-hydroxy-4-parabromobenzyloxybenzophenone | | | | | | | 0.25 | 0.25 | 0.25 | | | |
| 2-hydroxy-4-(2,3,4,5,6-pentachlorobenzyloxy)-benzophenone | | | | | | | | | | 0.25 | 0.25 | 0.25 |

*Example 6*

Stabilized polypropylene compositions were prepared by mixing stabilizing compositions E through P with polypropylene; in the case of stabilizing compositions H, L and P the liquid form of the stabilizer system was utilized. The stabilizer systems were weighed and dispersed by hand stirring in 100 parts of powdered previously unstabilized polypropylene in the proportions indicated in Table V below. Each such sample mixture was placed on a 2-roll mill and fluxed for five minutes at 170±2° C.

It was found that all stabilized polypropylene compositions were colorless and odorless, with the exception of Sample Numbers T, U and V which were each slightly off-white. The stabilizing systems proved themselves to be compatible with the polymer and were of sufficiently low volatility so that they were not lost from the polymer during processing or subsequent thereto. It appeared that these stabilizing systems did not "bleed out" of the polymer even over an extended period of time.

TABLE V

| Sample No. | Parts | | | | | | | | | | | |
|---|---|---|---|---|---|---|---|---|---|---|---|---|
| | Q | R | S | T | U | V | W | X | Y | Z | AA | AB |
| Polypropylene (Profax 6501) | 100 | 100 | 100 | 100 | 100 | 100 | 100 | 100 | 100 | 100 | 100 | 100 |
| Xylene | | | | 1.0 | | | | 1.0 | | | | 1.0 |
| 4,4'-thiobis(2-tert-butyl-5-methyl-phenol) | 0.05 | | | 0.05 | | | 0.05 | | | 0.05 | | |
| Isooctyl diphenyl phosphite | 0.14 | 0.14 | 0.14 | 0.14 | 0.14 | 0.14 | 0.14 | 0.14 | 0.14 | 0.14 | 0.14 | 0.14 |
| Zinc 2-ethylhexoate | 0.06 | 0.06 | 0.06 | 0.06 | 0.06 | 0.06 | 0.06 | 0.06 | 0.06 | 0.06 | 0.06 | 0.06 |
| 4,4'-butylidene-bis-(3-methyl-6-t-butyl-phenol) | | 0.05 | 0.05 | | 0.05 | 0.05 | | 0.05 | 0.05 | | 0.05 | 0.05 |
| Dilauryl thiodipropionate | | 0.25 | | | 0.25 | | | 0.25 | | | 0.25 | |
| 2-hydroxy-4-benzyloxy-benzophenone | | | | 0.25 | 0.25 | 0.25 | | | | | | |
| 2-hydroxy-4-para-bromobenzyloxy-benzophenone | | | | | | | 0.25 | 0.25 | 0.25 | | | |
| 2-hydroxy-4-(2,3,4,5,6-pentachlorobenzyloxy)-benzophenone | | | | | | | | | | 0.25 | 0.25 | 0.25 |

*Example 7*

The stabilized polypropylene compositions Q through AB were made into 6" x 6" x 0.020" molded slabs made from each of the sample compositions. One sample slab of each composition was exposed for 350 hours in the weatherometer at 52° C. Black Panel temperature. Subsequently the color and melt index of the unexposed sample was compared with that of the same sample exposed to the degradative effects of light, The melt indices of the samples were determined at 230° C. using a 2160 g. weight load on the plastometer piston.

These determinations indicate that the monobenzyl ethers of 2,4-dihydroxybenzophenone are each effective in stabilizing polypropylene against the degradative effects resulting from exposure to light, and that the partially halogenated derivatives are slightly better than the unsubstituted derivatives.

In each case where a stabilizer of this invention was added to polypropylene, degradation of the polymer upon exposure in the weatherometer was reduced as compared to polypropylene not so stabilized against photodegradation. Samples Z, AA, and AB showed only very slight increase in melt index; samples T through Y were nearly equally effective in preventing physical degradation of the polymer as evidenced by change in its melt index.

TABLE VIII

| Sample No | Unexposed | | | |
|---|---|---|---|---|
| | AC | AD | AE | AF |
| Melt Index | 1.0 | 1.0 | 1.0 | 1.0 |
| Color | Light yellow | White | Green | White |

| Sample No | Exposed (350 hours) | | | |
|---|---|---|---|---|
| | AC | AD | AE | AF |
| Melt Index | 4.5 | 51.3 | 47.5 | 49.6 |
| Color | Light yellow | White | Green | White |

TABLE VI

| Sample No | Unexposed | | | | | | | | | | | |
|---|---|---|---|---|---|---|---|---|---|---|---|---|
| | Q | R | S | T | U | V | W | X | Y | Z | AA | AB |
| Melt Index | 1.0 | 1.0 | 1.0 | 1.0 | 1.0 | 1.0 | 1.0 | 1.0 | 1.0 | 1.0 | 1.0 | 1.0 |
| Color | White | White | White | Off white | Off white | Off white | White | White | White | White | White | White |
| | Exposed | | | | | | | | | | | |
| Melt Index | >120 | >120 | >120 | 48.2 | 52.3 | 31.9 | 37.4 | 36.7 | 34.8 | 13.6 | 11.7 | 15.2 |
| Color | Light tan | White | White | Off white | Off white | Off white | White | White | White | White | White | White |

All samples containing one of the stabilizers of this invention were effective in preserving the color of the polypropylene upon exposure in the weatherometer. The fact that the addition of 2-hydroxy-4-benzyloxy-benzophenone as light stabilizer caused those samples to become very slightly discolored would be disadvantageous only where the polymer is to be used in clear or white form, but would not detract from the usefulness that light stabilizer of this invention where dyes or other coloring matter are to be added to the polymer.

*Example 8*

In order to further evaluate the light stabilizers of this invention, test slabs of polypropylene were formulated incorporating some of the previously known and commercially available light stabilizers. These polymer compositions were prepared by weighing and hand stirring the components in the proportions of Table VII below, and mixing each test sample at 170±2° C. on a 2-roll mill for five minutes.

TABLE VII

| Sample No | Parts | | | |
|---|---|---|---|---|
| | AC | AD | AE | AF |
| Polypropylene (Profax 6501) | 100 | 100 | 100 | 100 |
| 4,4'-butylidene-bis-(3-methyl-6-t-butyl-phenol) | 0.05 | 0.05 | 0.05 | 0.05 |
| Isooctyl diphenyl phosphite | 0.14 | 0.14 | 0.14 | 0.14 |
| Zinc 2-ethylhexoate | 0.06 | 0.06 | 0.06 | 0.06 |
| Dilauryl thiopropionate | 0.25 | 0.25 | 0.25 | 0.25 |
| Octylphenyl salicylate | 0.25 | | | |
| 2-hydroxy-4-methoxy-benzophenone | | 0.25 | | |
| Nickel chelate of bis-(octylphenol) sulfide | | | 0.25 | |
| 2-(2'hydroxy-5'-methyl-phenyl)-benzotriazole | | | | 0.25 |

The tests were conducted on 20 ml. 6" x 6" molded slabs, which were exposed in the weatherometer for 350 hours at 52° C. Black Panel temperature. These slabs were removed and the melt index taken at 230° C. using a 2160 g. weight on the plastometer piston. Color and melt index for these samples are tabulated below.

The above data clearly disclose some of the disadvantages of presently known light stabilizers, which are overcome with the new light stabilizers according to this invention.

Samples Nos. AC and AE imparted their own distinct color to the polypropylene which renders these stabilizers of little value in preventing discoloration of the polymer. Applicant's stabilizers of samples T through AB did not impart any color to the polymer to which they were added.

The stabilizers of samples AD, AE, and AF also were not sufficiently effective in preventing deterioration in the physical properties of polypropylene resulting from photodegradation as indicated by a substantial increase in the melt index.

*Example 9*

(a) 2-hydroxy-4-(3-bromo-4-isobutoxy-5-stearyl-benzyloxy)-6-ethyl-4'-chloro-benzophenone was prepared as a light stabilizer in accordance with this invention.

(b) The light stabilizer of this invention was incorporated in commercially available prestabilized polypropylene in quantities of from 1 to 2% by weight of polymer. Of the various types of polypropylene, already prestabilized for increased resistance to degradative deterioration due to heat and aging, which are commercially available, Profax 6512, having an initial melt index of 1.0, was used in this test. The stabilizer of this invention was weighed and dispersed by hand stirring in powdered prestabilized polypropylene and milled for five minutes on a two-roll mill at 170±2° C. to assure thorough and even distribution of the light stabilizer of this invention.

(c) Samples of prestabilized polypropylene and of prestabilized polypropylene to which a light stabilizer had been added in accordance with this invention, were exposed for 350 hours in the weatherometer at 52° C. Black Panel temperature. Upon comparison of the melt indices and color, it was found that the addition of a light stabilizer in accordance with this invention to prestabilized polypropylene greatly increased the resistance of the polymer to photodegradation.

*Example 10*

2-hydroxy-4(4-ethylbenzyloxy)-3'-chloro-benzophenone was prepared as a light stabilizer in accordance with this invention by reacting 2,4-dihydroxy-3'-chloro-benzophenone (20 g.), with 4-ethyl benzylchloride (19 g.), and anhydrous potassium carbonate (19.5 g.) in 200 cc. methylethylketone under reflux conditions for eighteen hours. The solution was filtered while still warm and the product allowed to crystallize from the filtrate.

To 100 parts of previously unstabilized polypropylene (Profax 6501), of reduced specific viscosity 3.4, and having an initial melt index of 1.0, ASTM D 1238–57T, at 230° C., was added one part of 2-hydroxy-3'-chloro-4-(4-ethyl benzyloxy)-benzophenone. The mixture was placed on a 2-roll mill and fluxed for five minutes at 170±2° C.

Samples of the so stabilized polypropylene composition and of unstabilized polypropylene were exposed in the weatherometer for 350 hours. Subsequent comparison of color and melt index indicated that the stabilizer of this invention effectively increased the resistance of the polymer to photodegradation.

Example 11

2-hydroxy-4-(4-fluorobenzyloxy)-5-furfuryl-3'-furfuryl-benzophenone was prepared as a light stabilizer in accordance with this invention.

When incorporated in polypropylene in quantities from 1 to 2% by weight of polymer, this compound was found to increase the resistance of the polyolefin to degradation due to exposure to light.

Example 12

(a) 2-hydroxy-4-(4-furfurylbenzyloxy)-3,5-dichloro-4'-cyclohexyl-benzophenone was prepared as a light stabilizer in accordance with this invention.

(b) 0.25 part of this light stabilizer were mixed with 0.05 part of 4,4'-butylidene-bis-(3-methyl-6-t-butyl-phenol), 0.14 part of isooctyl diphenyl phosphite, 0.25 part of dilauryl thiodipropionate, and 100 parts of polypropylene. Upon exposure of test samples of this stabilized olefin composition in the weatherometer it was found that the addition of the stabilizer composition markedly increased the resistance of the polymer to photodegradation.

Example 13

2-hydroxy-4-(4-dodecylbenzyloxy)-5,5' - dinitrobenzophenone was prepared in accordance with this invention.

When incorporated in previously unstabilized polypropylene in quantities of from 1 to 2% by weight of polyolefin, the resistance of the polymer to deterioration upon exposure to light was increased.

Example 14

(a) 2 - hydroxy-4-(dodecyl-3-ol-benzyloxy)-5,3',4'-trifluoro-benzophenone was prepared in accordance with this invention.

(b) A blend of phosphite and phenol was prepared before incorporation with metal salt, thiodipropionic acid ester, the light stabilizer of this invention and the polymer, to prevent separation of the bisphenol.

100 g. of 4,4'-thiobis(2-t-butyl-5-methyl-phenol), 150 g. isooctyl diphenyl phosphite, and 0.5 g. of calcium hydroxide were stirred and heated at 120 to 125° C. for three hours. At the end of this period a clear brown solution had formed, which remained homogeneous at room temperature. When the reaction mixture was heated at 125 to 135° C. under reduced pressure, phenol was distilled off, showing that transesterification had occurred. This 40% concentrate (content 40% total, 4,4'-thiobis (2-t-butyl-5-methyl-phenol) was combined with more isooctyl diphenyl phosphite and with zinc 2-ethylhexoate and 2-hydroxy-4(dodecyl-3-ol-benzyloxy) - 5,3'4' - trifluorobenzophenone, to yield a stabilizer system of the following composition:

| | Parts |
|---|---|
| Transesterification product of 4,4'-thiobis(2-t-butyl-5-methylphenol) and isooctyl diphenyl phosphite | 25 |
| Isooctyl diphenyl phosphite | 10 |
| Zinc-2-ethylhexoate | 12.5 |
| 2-hydroxy-4(dodecyl-3-ol-benzyloxy)-5,3',4' - trifluoro-benzophenone | 25 |

(c) This composition was blended with polypropylene using the procedure of Example 1(c). Test samples thereof were exposed in the weatherometer and tested for resistance to photodegradation in accordance with the procedure of Example 1(d). A comparison of stabilized with unstabilized test samples proved that the addition of a light stabilizer in accordance with this invention greatly increased the resistance of the polyolefin to deterioration due to exposure to light as evidenced by a reduced rate of increase in melt index and a reduced rate of discoloration.

Example 15

6" x 1" x 0.020" test strips of stabilized and unstabilized polypropylene were prepared. Sample strips AP and AP' were molded directly from unstabilized polypropylene (Profax 6501), having a reduced specific viscosity of 3.4 and an initial melt index of 1.0 ASTM D 1238–57T, at 230° C. Sample strips AQ and AQ' were prepared from polypropylene (Profax 6501) to which 0.25% by weight of polymer 2-hydroxy-4-(3,4-dichlorobenzyloxy)-benzophenone was added and milled to evenly distribute the stabilizer throughout the polymer. Sample strips AP, AP', AQ, and AQ' were continuously exposed in an Atlas twin-arc weatherometer and flexed once every 16⅔ hours at 25° C. until they cracked. All test samples were initially white and remained so until failure. The results were as follows:

TABLE IX

| Sample No.: | Hours to failure |
|---|---|
| AP | 33⅓ |
| AP' | 33⅓ |
| AQ | 150 |
| AQ' | 133⅓ |

The above example demonstrates that the addition of a light stabilizer in accordance with this invention markedly increases the resistance of a polymer to photodegradation as evidenced by deterioration of the physical properties of the polymer.

Example 16

Test strips were prepared as in the previous example. Sample strips AR and AR' contained a conventional polypropylene heat stabilizer and in samples AS and AS' this conventional heat stabilizer was added in combination with a light stabilizer of this invention in the proportions shown in the table below:

TABLE X

| Sample No. | AR | AR' | AS | AS' |
|---|---|---|---|---|
| Polypropylene(Profax 6501) | 100 | 100 | 100 | 100 |
| 4,4'-thiobis-(2-t-butyl-5-methylphenol) | .10 | .10 | .10 | .10 |
| 2-hydroxy-4-(3,4-dichlorobenzyloxy)-benzophenone | | | .25 | .25 |

Samples No. AR through AS' were continuously exposed in an Atlas twin-arc weatherometer and flexed once every 16⅔ hours. The time at which cracking first occurred upon flexing is recorded in the table below. All samples were initially white; sample numbers AR and AR' turned tan-brown after 33½ hours, samples AS and AS' remained white until failure.

EXAMPLE XI

| Sample No.: | Hours to failure |
|---|---|
| AR | 100 |
| AR' | 116⅔ |
| AS | 233⅓ |
| AS' | 250 |

These results demonstrate that the incorporation of a light stabilizer in accordance with this invention in combination with a conventional heat stabilizer in polypropylene as an additional stabilizer vastly improves the resistance of the polymer to photodegradation. The heat stabilizer vastly improves the resistance of the polymer to photodegradation. The heat stabilizer alone (samples AR and AR') increased the resistance to degradation slightly over unstabilized polypropylene (samples AP and AP', above) and the light stabilizer of this invention alone (samples AQ and AQ', above) was considerably more effective in increasing resistance to photodegradation. However, the combination of both a heat and a light stabilizer (samples AS and AS') is superior to either one alone.

*Example 17*

To 100 parts of previously unstabilized linear (low pressure) polyethylene, initial melt index 0.68, ASTM D 1238-57T, was added one part of 2-hydroxy-4-(2,3,4,5,6-pentachlorobenzyloxy)-benzophenone. The dry mixture was hand stirred, placed on a 2-roll mill and fluxed for five minutes at 155±2° C. to assure thorough and even distribution of the stabilizer of this invention throughout the polymer.

Samples of the so stabilized polyethylene composition and of unstabilized polyethylene were exposed in the weatherometer for 350 hours. Subsequent comparison of color and melt index indicated that the stabilizer of this invention effectively increased the resistance of the polymer to photodegradation.

*Example 18*

Polyethylene and polybutylene compositions were prepared, with and without a light stabilizer as indicated in the table below. The stabilizers were weighed and dispersed by hand stirring in 100 parts of powdered previously unstabilized polymer. The polyethylene samples were prepared from DYNH, high pressure polyethylene, having an initial melt index of 0.70 determined at 190° C., ASTM D 1238-57T, and milled for five minutes at 130° C. in order to achieve even distribution of the stabilizer throughout the sample. The poly-n-butylene sample used had an initial melt index of 0.12, determined at 190° C., ASTM D-1238-57T, and was milled for five minutes at 130° C. in order to obtain uniform distribution throughout the sample.

TABLE XII

| Sample No. | AT | AU | AV | AW |
|---|---|---|---|---|
| Polyethylene (DYNH) | 100 | 100 | | |
| Polybutylene | | | 100 | 100 |
| 2-hydroxy-4-(2,3,4,5,6-pentachloro-benzyloxy)-benzophenone | | 0.30 | | 0.30 |

Sample slabs of each of the above polymer sample compositions, AT through AW, were exposed for 350 hours in an Atlas twin-arc weatherometer at 52° C. Black Panel. Subsequently the exposed sample slabs were compared with unexposed slabs of the same composition, and with each other. It was found that both in the case of polyethylene and of polybutylene the samples containing the light stabilizer suffered less deterioration in both color and melt index than did the unstabilized samples upon exposure to light.

*Example 19*

2-hydroxy-4-(4-chlorobenzyloxy)-benzophenone was prepared as a light stabilizer in accordance with this invention.

When incorporated in poly-4-methyl-pentene in quantities from 1 to 2% by weight of polymer, this compound was found to increase the resistance of the polyolefin to degradation due to exposure to light.

*Example 20*

2-hydroxy-4-(3,4-dichlorobenzyloxy)-benzophenone was prepared in accordance with this invention.

When incorporated in a copolymer of propylene and ethylene in quantities of from 1 to 2% by weight of polyolefin, the light stabilizer of this invention was found to increase the resistance of the polymer to photodegradation.

*Example 21*

2-hydroxy-4-(4-dodecylbenzyloxy)-5,5' - dinitrobenzophenone was prepared in accordance with this invention.

When incorporated in a mixture of polybutylene, poly-n-pentene, and poly-4-methyl-pentene in quantities of from 1 to 2% by weight of polyolefin, the resistance of the polymer to deterioration upon exposure to light was reduced.

*Example 22*

Two parts of 2-hydroxy-4-benzyloxy-benzophenone were incorporated in one hundred parts of previously unstabilized powdered polypropylene (Profax 6501) having an initial melt index of 1.0 ASTM D 1238-57T, at 230° C., and a reduced specific viscosity of 3.4.

Test samples of the so stabilized polypropylene composition were exposed in an Atlas twin-arc weatherometer together with samples of unstabilized polypropylene. It was found that the addition of a light stabilizer in accordance with this invention markedly increased the resistance of polypropylene to degradative deterioration due to exposure to light.

*Example 23*

2 - hydroxy-4-(4-methylbenzyloxy)-benzophenone was prepared in accordance with this invention.

When incorporated in previously unstabilized polypropylene in quantities of from 1 to 2% by weight of polymer, the tendency of the polypropylene to deterioration upon exposure to light was markedly reduced.

Having regard to the foregoing disclosure, the following is claimed as the inventive and patentable embodiments thereof:

1. A stabilizer composition for use in improving the resistance of polyolefins produced from monomers containing from about two to about six carbon atoms to deterioration in physical properties comprising an amount within the range from about 0.1 to about 500 parts by weight of a benzophenone compound and an amount within the range from about 0.4 to about 500 parts by weight of another polyolefin stabilizer selected from the group consisting of phenols, organic phosphites, salts of organic non-nitrogenous monocarboxylic acids, thiodipropionic acid esters, organic mercaptans and organic polysulfides, the benzophenone compound being characterized by the formula

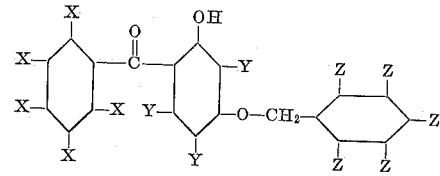

wherein X is selected from the group consisting of hydrogen, halogen, nitro groups, and alicyclic, heterocyclic, and saturated aliphatic radicals of from one to thirty carbon atoms, and Y and Z are selected from the group consisting of hydrogen, halogen, and alicyclic, heterocyclic, and saturated aliphatic radicals of from one to thirty carbon atoms.

2. A stabilizer composition in accordance with claim 1 wherein the other polyolefin stabilizer consists essentially of from about 2.5 to about 50 parts by weight of an organic polyhydric phenol, from about 2.5 to about 75 parts by weight of a salt of an organic non-nitrogenous monocarboxylic acid having from about six to about twenty-four carbon atoms and a metal of Group II of the Periodic Table, and from about 5 to about 125 parts by weight of an organic phosphite triester.

3. A stabilizer composition in accordance with claim 1 wherein the other polyolefin stabilizer consists essentially of from about 2.5 to about 50 parts by weight of an organic phenol, from about 5 to about 125 parts by weight of an organic phosphite triester, and from about 2.5 to about 100 parts by weight of an ester of thiodipropionic acid.

4. A stabilizer composition in accordance with claim 1 wherein the other polyolefin stabilizer consists essentially of from about 2.5 to about 50 parts by weight of an organic phenol, from about 2.5 to about 75 parts by weight of a salt of an organic non-nitrogenous monocarboxylic acid having from about six to about twenty-four carbon atoms and a metal of Group II of the Periodic Table, from about 5 to about 125 parts by weight of an organic phosphite triester, and from about 5 to about 100 parts by weight of an ester of thiodipropionic acid.

5. A polyolefin composition having improved resistance to photodegradation comprising a polyolefin produced from monomers containing from about two to about six carbon atoms, and a stabilizing amount within the range from about 0.001 to about 5% by weight of the polyolefin of a benzophenone compound in accordance with claim 1.

6. A polyolefin composition in accordance with claim 5 wherein at least one Z is halogen.

7. A polyolefin composition in accordance with claim 5 wherein at least one Z is an alkyl radical of from one to thirty carbon atoms.

8. A polyolefin composition in accordance with claim 5 wherein at least one of X, Y and Z is halogen.

9. A polyolefin composition in accordance with claim 5 wherein at least one of X, Y and Z is an alkyl radical of from one to thirty carbon atoms.

10. A polyolefin composition in accordance with claim 5 in which the polyolefin is polypropylene.

11. A polyolefin composition in accordance with claim 5 in which the polyolefin is polyethylene.

12. A polyolefin composition in accordance with claim 5 containing another polyolefin stabilizer selected from the group consisting of phenols, organic phosphites, salts of organic non-nitrogenous monocarboxylic acids, thiodipropionic acid esters, organic mercaptans and organic polysulfides in an amount within the range from about 0.004 to about 5% by weight of the polymer, the total amount of benzophenone and other stabilizers not being greater than about 5% by weight of the polyolefin.

13. Compounds having the structure:

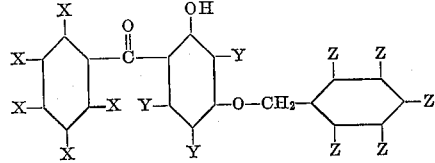

wherein X is selected from the group consisting of hydrogen, halogen, nitro groups, and organic radicals of from one to thirty carbon atoms, and Y and Z are selected from the group consisting of hydrogen, halogen, and alicyclic, heterocyclic and saturated aliphatic radicals of from one to thirty carbon atoms, at least one Z being selected from the group consisting of halogen and alicyclic, heterocyclic and saturated aliphatic radicals of from one to thirty carbon atoms.

14. Compounds in accordance with claim 13 wherein at least one Z is halogen.

15. Compounds in accordance with claim 13 wherein at least one Z is an alkyl radical having from one to thirty carbon atoms.

16. Compounds in accordance with claim 13 wherein at least one of X, Y, and Z is halogen.

17. Compounds in accordance with claim 13 wherein at least one of X, Y and Z is an alkyl radical of from one to thirty carbon atoms.

18. A polypropylene composition having improved resistance to photodegradation, comprising polypropylene and from about 0.004 to about 5% by weight of a stabilizer combination in accordance with claim 2, the total amount of benzophenone and other stabilizers not being greater than about 5% by weight of the polypropylene.

19. A polypropylene composition having improved resistance to photodegradation, comprising polypropylene and from about 0.004 to about 5% by weight of a stabilizer combination in accordance with claim 3, the total amount of benzophenone and other stabilizers not being greater than about 5% by weight of the polypropylene.

20. A polypropylene composition having improved resistance to photodegradation, comprising polypropylene and from about 0.004 to about 5% by weight of a stabilizer combination in accordance with claim 4, the total amount of the benzophenone and other stabilizers not being greater than about 5% by weight of the polypropylene.

References Cited

UNITED STATES PATENTS

| | | | |
|---|---|---|---|
| 2,972,597 | 2/1961 | Newland et al. | 260—45.95 |
| 2,976,259 | 3/1961 | Hardy et al. | 260—45.95 |
| 2,976,260 | 3/1961 | Newland et al. | 260—45.95 |
| 2,980,645 | 4/1961 | Newland et al. | 260—45.95 |
| 2,985,617 | 5/1961 | Salyer et al. | 260—45.95 |
| 3,003,996 | 10/1961 | Newland et al. | 260—45.95 |
| 3,006,959 | 10/1961 | Armitage et al. | 260—45.95 |
| 3,039,993 | 6/1962 | Friedman | 260—45.7 |
| 3,049,503 | 8/1962 | Milionis et al. | 260—45.95 |
| 3,069,369 | 12/1962 | Galbraith et al. | 260—45.95 |
| 3,098,842 | 7/1963 | Armitage et al. | 260—45.95 |
| 3,188,298 | 6/1965 | Williamson et al. | 260—45.85 |
| 3,192,179 | 6/1965 | Spatz et al. | 260—45.95 |

FOREIGN PATENTS

| | | |
|---|---|---|
| 577,252 | 7/1959 | Belgium. |
| 851,670 | 10/1960 | Great Britain. |

OTHER REFERENCES

Chemical Abstracts, vol. 46 (1952), 1191 b.

LEON J. BERCOVITZ, *Primary Examiner*.

R. A. WHITE, *Assistant Examiner*.

UNITED STATES PATENT OFFICE
CERTIFICATE OF CORRECTION

Patent No. 3,322,705                                           May 30, 1967

Otto S. Kauder et al.

It is hereby certified that error appears in the above numbered patent requiring correction and that the said Letters Patent should read as corrected below.

Column 9, line 64, for "cycloalky" read -- cycloalkyl --; column 12, line 23, for "to photodegration" read -- of photodegradation --; column 14, line 21, for "sufficently" read -- sufficiently --; columns 15 and 16, in TABLE IV, first column, line 4 thereof, for "4,4′butylidene" read -- 4,4′-butylidene --; column 16, line 76, for "light," read -- light. --; column 17, line 70, for "20 ml." read -- 20 mil. --; column 20, line 73, beginning with "The heat" strike out all to and including "photodegradation." in line 75, same column 20; column 21, line 1, for "degrdaation" read -- degradation --; same column 21, TABLE XII, first column, line 3 thereof, for "-benxyl" read ---benzyl --; column 24, after line 41, insert the following reference:

--     3,033,814     5/1962     Tholstrup ------260-45.95  --.

Signed and sealed this 18th day of June 1968.

(SEAL)
Attest:

EDWARD M. FLETCHER, JR.                            EDWARD J. BRENNER
Attesting Officer                                       Commissioner of Patents